United States Patent
Ouchi et al.

(10) Patent No.: US 8,940,257 B2
(45) Date of Patent: Jan. 27, 2015

(54) METHOD FOR COLLECTION OF RUTHENIUM OR RUTHENIUM COMPOUND

(75) Inventors: Takashi Ouchi, Yokkaichi (JP); Yoshio Nishimura, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/985,980

(22) PCT Filed: Feb. 10, 2012

(86) PCT No.: PCT/JP2012/053050
§ 371 (c)(1),
(2), (4) Date: Aug. 16, 2013

(87) PCT Pub. No.: WO2012/111542
PCT Pub. Date: Aug. 23, 2012

(65) Prior Publication Data
US 2013/0330255 A1    Dec. 12, 2013

(30) Foreign Application Priority Data
Feb. 18, 2011    (JP) ................................. 2011-032980

(51) Int. Cl.
| | | |
|---|---|---|
| C01G 55/00 | (2006.01) | |
| C22B 3/00 | (2006.01) | |
| C22B 3/24 | (2006.01) | |
| C02F 1/28 | (2006.01) | |
| C02F 101/20 | (2006.01) | |

(52) U.S. Cl.
CPC . C22B 11/04 (2013.01); C22B 3/24 (2013.01); C22B 11/046 (2013.01); C02F 1/281 (2013.01); C02F 2101/20 (2013.01)
USPC .............................................. 423/22; 75/744

(58) Field of Classification Search
None
See application file for complete search history.

(56) References Cited

U.S. PATENT DOCUMENTS

| | | | |
|---|---|---|---|
| 4,002,470 A | 1/1977 | Isa et al. | |
| 2004/0118249 A1 | 6/2004 | Asano et al. | |
| 2010/0080744 A1 | 4/2010 | Schmidt et al. | |
| 2011/0165041 A1* | 7/2011 | Meyer et al. ................... | 423/22 |
| 2011/0286898 A1* | 11/2011 | Henze et al. ................... | 423/22 |

FOREIGN PATENT DOCUMENTS

| | | |
|---|---|---|
| CN | 101654740 A | 2/2010 |
| EP | 0224 209 A2 | 6/1987 |
| JP | 52-048259 | 4/1977 |
| JP | S5638273 B2 | 9/1981 |
| JP | S616130 A | 1/1986 |
| JP | 01-230730 A | 9/1989 |
| JP | H01225730 A | 9/1989 |
| JP | 02-254126 A | 10/1990 |
| JP | H0433733 B2 | 6/1992 |
| JP | H0778264 B2 | 8/1995 |
| JP | H08-217460 A | 8/1996 |
| JP | 2002-275555 A | 9/2002 |
| JP | 2003201526 | 7/2003 |
| JP | 2004-332041 A | 11/2004 |
| JP | 2005-002376 A | 1/2005 |
| JP | 2005-194546 A | 7/2005 |
| JP | 2005-239441 A | 9/2005 |
| JP | 3733909 B2 | 1/2006 |
| JP | 2007-302944 A | 11/2007 |
| JP | 2007302938 A | 11/2007 |
| JP | 4116490 B2 | 7/2008 |
| JP | 4144311 B2 | 9/2008 |
| JP | 4506041 B2 | 7/2010 |
| JP | 2010-174336 A | 8/2010 |
| JP | 5168493 B2 | 3/2013 |
| JP | 5168499 B2 | 3/2013 |

OTHER PUBLICATIONS

Koza, Jikken Kagaku, et al., Seminar on Experimental Chemistry, Catalytic Chemistry, Electrochemistry, edited by the Chemical Society of Japan, 5th edition, Maruzen Co., Ltd., Jan. 2006, pp. 57-58 (vol. 25), with English language translation.
International Search Report dated Apr. 24, 2012, issued in International Application PCT/JP2012/053050.

* cited by examiner

Primary Examiner — Steven Bos
(74) Attorney, Agent, or Firm — Fitch, Even, Tabin & Flannery LLP

(57) ABSTRACT

According to the present invention, ruthenium or a ruthenium compound, which is expensive, can be collected with high efficiency even from an aqueous solution containing a water-soluble salt, a lower alcohol, an organic acid or the like, by adding at least one specific inorganic adsorbent to an aqueous solution containing ruthenium or the ruthenium compound, dissolving the entirety or a part of the inorganic adsorbent under an acidic condition, and then adding an alkali to adjust the solution to be an alkaline solution having a pH value of 7 or higher, thereby depositing the inorganic adsorbent while causing the inorganic adsorbent to adsorb ruthenium or the ruthenium compound.

10 Claims, No Drawings

US 8,940,257 B2

METHOD FOR COLLECTION OF RUTHENIUM OR RUTHENIUM COMPOUND

CROSS-REFERENCE TO RELATED APPLICATIONS

This Application is a U.S. National Stage Application filed under 35 U.S.C. §371 of International Application PCT/JP2012/053050, filed Feb. 10, 2012, designating the United States, which claims priority from Japanese Patent Application 2011-032980, filed Feb. 18, 2011, the complete disclosures of which are hereby incorporated herein by reference in their entirety for all purposes.

TECHNICAL FIELD

The present invention relates to a technology for efficiently collecting ruthenium or a ruthenium compound from an aqueous solution containing ruthenium or the ruthenium compound by use of a specific inorganic adsorbent.

BACKGROUND ART

Ruthenium, which is one type of rare metal materials, is used as chemical catalysts and also used as electronic industrial materials for electrodes, resistors and the like, or plating materials. Recently, magnetism of ruthenium has been utilized for hard discs, and thus demand for ruthenium has been remarkably increased. Because of balance between the production amount and demand, cost of ruthenium has been raised. Therefore, it is now desired to collect ruthenium compounds at a high collection ratio from aqueous solutions, waste water and the like containing ruthenium or the like, and to recycle ruthenium. Many methods have been proposed for separating and collecting ruthenium or ruthenium compounds. A general method is an oxidation and distillation method, by which ruthenium tetroxide is generated by use of an oxidizer such as halogen gas, sodium hypochlorite, sodium bromate, ozone or the like and is collected by distillation (see, for example, Patent Documents 1 through 4). However, the oxidation and distillation method has problems that the generated ruthenium tetroxide is unstable and explodes by autolysis, and is also easily corroded (oxidized) and thus is limited in the materials to be used therewith.

Hydroxyapatite, which is one type of calcium phosphate, is known as a compound having a cation exchange capability and adsorbability and being capable of immobilizing ruthenium or the like (see, for example, Non-patent Document 1). A method using hydroxyapatite to put ruthenium or the like into contact with a heavy metal material in an aqueous solution containing phosphoric acid ions and having a pH value of 6 or higher, and thus generating a sparingly soluble product on a surface of a phosphate mineral to remove heavy metal material ions has been proposed (Patent Document 5).

Calcium phosphate compounds are not sufficiently resistant against acids and the adsorbent itself is dissolved under an acidic condition. Therefore, the calcium phosphate compounds are generally handled under a neutral or alkaline condition in which the calcium phosphate compounds can be kept solid. However, when a calcium phosphate compound in a solid state is used as an adsorbent, there is a problem that ions in crystals are not sufficiently released and thus the adsorbability of the calcium phosphate compound cannot be sufficiently utilized.

Other methods for separating and collecting ruthenium or ruthenium compounds include the following: a method by which ruthenium or a ruthenium compound, after being subjected to some pre-process or supplied with a drug, is put into contact with an ion exchange resin, a chelate resin, a resin having no ion exchange group such as polyethylene or the like, activated carbon or the like and thus is separated (see, for example, Patent Documents 6 through 11); a method of generating a precipitate by an amino compound and a heteropoly acid (Patent Document 12); and a method by which ruthenium or a ruthenium compound is mixed with an acid or an alkali, then melted or exudated by use of an oxidizer and thus separated (see, for example, Patent Documents 13 through 16). However, these methods have been developed mainly for the purpose of smelting, or refining and separating, ruthenium or ruthenium compounds from ores, not from a low concentration aqueous solution of ruthenium. Therefore, these methods have problems that, for example, the process is complicated. There are other problems that, for example, when a salt, a lower alcohol or an organic acid which inhibits an oxidation-reduction operation or an ionization operation is contained, the collection ratio is decreased.

CITATION LIST

Patent Literature

Patent Document 1: Japanese Laid-Open Patent Publication No. Hei 1-225730
Patent Document 2: Japanese Patent Publication for Opposition No. Hei-4-33733
Patent Document 3: Japanese Laid-Open Patent Publication No. 2005-239441
Patent Document 4: Japanese Patent No. 4116490
Patent Document 5: Japanese Patent Publication for Opposition No. Sho-56-38273
Patent Document 6: Japanese Laid-Open Patent Publication No. Hei-2-254126
Patent Document 7: Japanese Patent No. 4144311
Patent Document 8: Japanese Patent Publication for Opposition No. Hei-7-78264
Patent Document 9: Japanese Laid-Open Patent Publication No. 2007-302938
Patent Document 10: Japanese Patent No. 4506041
Patent Document 11: Japanese Laid-Open Patent Publication No. 2005-2376
Patent Document 12: Japanese Laid-Open Patent Publication No. 2005-194546
Patent Document 13: Japanese Laid-Open Patent Publication No. Sho-51-68493
Patent Document 14: Japanese Laid-Open Patent Publication No. Sho-51-68499
Patent Document 15: Japanese Laid-Open Patent Publication No. Hei-1-230730
Patent Document 16: Japanese Patent No. 3733909

Non-Patent Literature

Non-patent Document 1: "Jikken Kagaku Koza (Vol. 25) Shokubai Kagaku, Denki Kagaku" (Seminar on Experimental Chemistry (Vol. 25) Catalytic Chemistry, Electrochemistry)" edited by the Chemical Society of Japan, 5th edition, Maruzen Co., Ltd., January 2006, pp. 57-58

SUMMARY OF INVENTION

Technical Problem

The present invention, in light of the above-described problems, has an object of providing a technology for efficiently collecting ruthenium or a ruthenium compound, which costs high, from an aqueous solution, especially an aqueous solution containing a water-soluble salt, a lower alcohol, an organic acid or the like.

Solution to Problem

The present inventors made active studies on the above-described problems, and found the following and thus arrived at the present invention: When an operation is performed of adding an inorganic adsorbent to an aqueous solution containing ruthenium or a ruthenium compound, dissolving the entirety or a part of the inorganic adsorbent under an acidic condition, then adding an alkali to adjust the solution to be an alkaline solution having a pH value of 7 or higher, and depositing the inorganic adsorbent, the adsorbability is significantly improved than when the inorganic adsorbent is merely added.

Namely, the present invention is directed to the following:

<1> A method for collection of ruthenium or a ruthenium compound, comprising the steps of putting an aqueous solution containing ruthenium or a ruthenium compound into contact with an inorganic adsorbent; dissolving the entirety or a part of the inorganic adsorbent under an acidic condition; and adding an alkali to deposit the dissolved inorganic adsorbent while causing the inorganic adsorbent to adsorb ruthenium or the ruthenium compound.

<2> The method for collection according to <1>, wherein the inorganic adsorbent is at least one selected from the group consisting of a calcium phosphate compound, a talcite compound, and an amorphous aluminumsilicate.

<3> The method for collection according to <1> or <2>, wherein the inorganic adsorbent is used in an amount which is, by mass, 0.1 to 100 times the amount of ruthenium or the ruthenium compound contained in the aqueous solution.

<4> The method for collection according to any one of <1> through <3>, wherein the aqueous solution containing ruthenium or the ruthenium compound contains a water-soluble salt, a lower alcohol or an organic acid.

<5> The method for collection according to any one of <1> through <4>, further comprising the step of performing, in advance, oxidation by an oxidizer and reduction by an alkali on the aqueous solution containing ruthenium or the ruthenium compound.

<6> The method for collection according to any one of <1> through <5>, further comprising the step of separating and collecting the inorganic adsorbent having ruthenium or the ruthenium compound adsorbed thereto from the aqueous solution by filtration, sedimentation or centrifugation.

<7> The method for collection according to any one of <1> through <6>, further comprising the step of putting ruthenium or the ruthenium compound adsorbed to the inorganic adsorbent into contact with an oxidizer to separate ruthenium or the ruthenium compound from the inorganic adsorbent.

<8> The method for collection according to <7>, further comprising the step of, after ruthenium or the ruthenium compound is separated from the inorganic adsorbent, putting the inorganic adsorbent into contact with an aqueous solution containing ruthenium or a ruthenium compound for reuse.

<9> The method for collection according to any one of <1> through <8>, wherein the step of dissolving the entirety or a part of the inorganic adsorbent under an acidic condition includes the step of adding an acid such that a pH value of the aqueous solution becomes 6 or lower.

<10> The method for collection according to any one of <1> through <9>, wherein the step of adding an alkali to deposit the dissolved inorganic adsorbent includes the step of adding the alkali such that a pH value of the aqueous solution becomes 7 or higher.

DESCRIPTION OF EMBODIMENTS

The present invention includes (1) an operation of putting an aqueous solution containing ruthenium or a ruthenium compound into contact with an inorganic adsorbent, (2) an operation of dissolving the inorganic adsorbent under an acidic condition, and (3) an operation of adding an alkali to the aqueous solution and causing the inorganic adsorbent to adsorb ruthenium or the ruthenium compound while depositing the inorganic adsorbent.

In the case where the aqueous solution containing ruthenium or the ruthenium compound is acidic, the operations (1) and (2) are performed concurrently.

First, the inorganic adsorbent in the present invention will be described.

On the type of inorganic adsorbent usable in the present invention, there is no specific limitation. Any inorganic adsorbent which has adsorbability or an ion exchange capability, and is not oxidized by a ruthenium compound and thus can coexist with the ruthenium compound in a reaction system, is usable. It is preferable to use a calcium phosphate compound, a talcite compound or an amorphous aluminumsilicate from the point of view of general availability.

Examples of the calcium phosphate compound include hydroxyapatite, fluoroapatite, chloroapatite, carbonated hydroxyapatite, carbonated fluoroapatite, calcium hydrogen phosphate, dicalcium phosphate, tricalcium phosphate, and the like. Among these, tricalcium phosphate and hydroxyapatite are especially preferable from the point of view of absorbability to a ruthenium compound and availability.

Examples of the talcite compound include hydrotalcite. It is especially preferable to use Mg—Al or Li—Al type hydrotalcite from the point of view of absorbability to a ruthenium compound and availability.

Examples of the amorphous aluminumsilicate include imogolite, alloferon and the like. Among these, imogolite is especially preferable from the point of view of availability.

These inorganic adsorbents may be used independently or as a combination of two or more thereof.

The inorganic adsorbent may be added in an amount, by mass, in the range of 0.1 times to 100 times the amount of ruthenium or the ruthenium compound contained in the aqueous solution. When the inorganic adsorbent is added in an amount in this range, the collection ratio of ruthenium or the ruthenium compound is raised. Among this range, the range of 0.5 times to 20 times is preferable, and the range of 1.0 times to 5.0 times is especially preferable.

Now, the aqueous solution containing ruthenium or a ruthenium compound, which is a target of the present invention, will be described.

Examples of the aqueous solution containing ruthenium or a ruthenium compound include an aqueous solution obtained in the middle of a smelting process or a process for producing a chemical substance, waste water from such a production process, a material solution usable for producing a product in which ruthenium is carried, covered or plated, and the like.

The aqueous solution may be a mixed aqueous solution containing a water-soluble salt such as sodium chloride, potassium chloride, sodium nitrate, sodium sulfate or the like; a lower alcohol having a carbon number of 6 or lower such as methanol, ethanol, propanol, isopropanol, butanol, t-butanol, pentanol, hexanol or the like; or an organic acid such as a formic acid, an acetic acid or the like. Two or more of the above-listed solvents may be used in mixture.

The effect of the present invention is preferably provided even when a water-soluble salt, a lower alcohol or an organic acid which inhibits an oxidation-reduction operation or an ionization operation is contained.

On the pH value of the aqueous solution, which is a target of the present invention, there is no specific limitation.

On the type of ruthenium or a ruthenium compound, which is to be collected by the present invention, there is no specific limitation. Examples of ruthenium or the ruthenium compound include ruthenium ion; perruthenate ion; hydroxides such as ruthenium hydroxide and the like; oxides such as ruthenium dioxide, ruthenium tetroxide and the like; halides such as ruthenium chloride, ruthenium bromide, ruthenium iodide and the like; inorganic and organic salts such as ruthenium sulfate, ruthenium nitrate, ruthenium acetate and the like; metal ruthenium; ruthenium-containing complex compounds; and the like. These substances may be used independently or as a combination of two or more thereof.

The present invention is also directed to ruthenium or a ruthenium compound which is generated by an operation of oxidizing an aqueous solution containing ruthenium or a ruthenium compound by use of an oxidizer in advance and then reducing the aqueous solution by use of an inorganic alkali. When such an operation is performed before the collection operation is performed by use of an inorganic adsorbent, the valence of ruthenium can be uniformized the collection ratio can be raised.

The oxidizer usable for oxidizing ruthenium or a ruthenium compound may be at least one selected from the group consisting of halogen, halogen acid, and salts thereof; oxygen, peracid, persulfuric acid, and salts thereof; and ferricyanide. Specific examples include halogen molecules such as chlorine, bromine and the like; halogen oxides such as dichlorine monoxide, chlorine dioxide, dibromine monoxide and the like; perhalogen acids such as periodic acid, perchloric acid and the like and salts thereof; halogen acids such as bromic acid, chloric acid and the like and salts thereof; halous acids such as bromous acid, chlorous acid and the like and salts thereof; hypohalous acids such as hypobromous acid, hypochlorous acid, sodium hypochlorite and the like and salts thereof; peracids such as molecular oxygen, hydrogen peroxide, performic acid, peracetic acid, perbenzoic acid, and the like; hydroperoxides such as cumenehydroperoxide, penzylhydroperoxide, and the like; peroxides such as tert-butylpenzylperoxide, dibenzoyl peroxide, and the like; persulfuric acids such as peroxydisulfuric acid, Caro's acid and the like and salts thereof; ferricyanides such as potassium ferricyanide, sodium ferricyanide and the like; N-methylmorpholine-N-oxide; and the like. Among these oxidizers, sodium hypochlorite is especially preferable from the point of view of availability. On the contact method or the concentration of the oxidizer, there is no specific limitation. The oxidizer may be added in a solid state, or a solution or the like thereof may be prepared in advance and added continuously or intermittently.

As a reductant for reducing oxidized ruthenium, an inorganic alkali is preferable. Examples of the inorganic alkali include alkali metal hydroxides such as sodium hydroxide, potassium hydroxide, lithium hydroxide, barium hydroxide and the like; alkali metal carbonates such as sodium carbonate, potassium carbonate, lithium carbonate, sodium hydrogen carbonate and the like; and ammonia and an aqueous solution thereof. Among these, sodium hydroxide and potassium hydroxide are preferably usable. As a reductant, an alcohol such as methanol, ethanol or the like is usable. However, when such an alcohol is used for waste water, an environmental load such as a COD component or the like is increased. Also from the economic point of view, an inorganic alkali is more preferable. On contact method or the concentration of the inorganic alkali as a reductant, there is no specific limitation. The reductant may be added in a solid state, or an alkaline solution having an appropriate concentration may be prepared in advance and added continuously or intermittently. The alkaline solution preferably has a pH value of 7 or higher so that the solubility of the inorganic adsorbent is sufficiently suppressed. From the point of view of decreasing the amount of alkali used for adjusting the pH value, the pH value of the alkaline solution is preferably in the range of 10 or lower.

By performing an oxidation-reduction operation, ruthenium or a ruthenium compound, which is to be processed, can be put into a form suitable to adsorption or ion exchange. This raises the collection ratio of ruthenium or a ruthenium compound.

Now, the operation (1) of putting an aqueous solution containing ruthenium or a ruthenium compound into contact with an inorganic adsorbent will be described.

On the contact method, there is no specific limitation. Usable methods include, for example, a batch method of putting an inorganic adsorbent into a tank which holds an aqueous solution containing ruthenium or a ruthenium compound and stirring the substances for a prescribed time duration, a method of adjusting the pH value of a distributing aqueous solution and adding an inorganic adsorbent thereto continuously or intermittently, and a method of filling a tower or a column with an inorganic adsorbent and putting ruthenium or a ruthenium compound into contact with the inorganic adsorbent while adjusting the pH value of the aqueous solution containing ruthenium or the ruthenium compound.

In order to collect ruthenium or a ruthenium compound highly efficiently, it is preferable to put the aqueous solution containing ruthenium or a ruthenium compound into contact with the inorganic adsorbent at a prescribed pH value. The pH value at which these substances contact each other is preferably 6 or lower so that a part or the entirety of the inorganic adsorbent is dissolved, and is more preferably 3 or lower so that the solubility of the inorganic adsorbent is increased. The pH value of the aqueous solution may be adjusted by use of an acid or an alkali before the contact with the inorganic adsorbent so that a prescribed pH value is obtained after the contact, or may be adjusted by use of an acid or an alkali after the contact with the inorganic adsorbent. On the concentration of the alkali to be added, there is no specific limitation. The alkali may be added in a solid state, or an aqueous solution thereof may be prepared in advance and added continuously or intermittently.

Next, the operation (2) will be described.

The operation (2) is required when ruthenium or a ruthenium compound, which is to be processed by the present invention, does not have a sufficient acidity to be an acid. In the operation (2), an acid is added to the aqueous solution obtained by the operation (1).

Example of the acid to be added include inorganic acids such as hydrochloric acid, nitric acid, sulfuric acid, hydrofluoric acid, phosphoric acid and the like; organic acids such as formic acid, acetic acid, propionic acid and the like; and aqueous solutions thereof. On the concentration of the acid to be added, there is no specific limitation. The acid may be added in a solid state, or an aqueous solution thereof may be prepared in advance and added continuously or intermittently. The acid is added in such an amount that the pH value of the aqueous solution is 6 or lower, and thus a part or the entirety of the adsorbent is dissolved.

Now, the operation (3) will be described.

In order to deposit the inorganic adsorbent partially or entirely dissolved in the acid, an alkali is added to the aqueous solution containing ruthenium or a ruthenium compound.

Examples of the alkali to be added include alkali metal hydroxides such as sodium hydroxide, potassium hydroxide, lithium hydroxide and the like; alkali metal carbonates such as sodium carbonate, potassium carbonate, lithium carbonate, sodium hydrogen carbonate and the like; ammonia and an aqueous solution thereof. Among these, sodium hydroxide and potassium hydroxide are preferable from the point of view of cost and availability. On the concentration of the alkali to be added, there is no specific limitation. The alkali may be added in a solid state, or an alkaline aqueous solution may be prepared in advance and added continuously or intermittently. The alkali is added in such an amount that the pH value of the aqueous solution is 7 or higher, and thus the inorganic adsorbent partially or entirely dissolved can be deposited.

The inorganic adsorbent which has ruthenium or a ruthenium compound adsorbed thereto and is deposited by the operation (3) can be easily collected by solid-solution separation such as precipitation, filtration or the like. For the solid-solution separation, any known method is usable. For example, filtration, sedimentation, centrifugation or the like can be selected. The inorganic adsorbent separated for reuse may be washed with water or a solvent.

Ruthenium or the ruthenium compound adsorbed to the inorganic adsorbent can be easily separated from the inorganic adsorbent by being put into contact with an oxidizer. For example, an inorganic adsorbent containing a ruthenium compound adsorbed thereto is dispersed in water, the resultant solution is adjusted in the pH value so as to be acidic, and chlorine gas is blown into the resultant solution. As a result, vapor of ruthenium tetroxide can be separated into the gas phase. Alternatively, an inorganic adsorbent having a ruthenium compound adsorbed thereto is dispersed in water, the resultant solution is adjusted in the pH value so as to be acidic, and the resultant solution is put into contact with an aqueous solution of perchloric acid such as sodium hypochlorite or the like. As a result, ruthenium tetroxide can be separated into the water phase from the inorganic adsorbent. The ruthenium compound separated in such a manner can be refined and reused by a known method such as distillation, extraction or the like. The inorganic adsorbent is also usable in repetition.

According to the present invention, ruthenium or a ruthenium compound can be efficiently collected from an aqueous solution containing a water-soluble salt, a lower alcohol, an organic acid or the like. In addition, after the inorganic adsorbent having ruthenium adsorbed thereto is separated, the post-process aqueous solution can be further processed by a known method such as oxidation or the like for the purpose of scavenging-precipitation, filtration, activated sludge process, and COD reduction.

EXAMPLES

Hereinafter, the present invention will be described more specifically by way of examples. The present invention is not limited to the following examples. A ruthenium compound contained in the water phase was quantified by ICP emission spectrometry (used device: ICP emission spectrometer SPS1200VR produced by Seiko Denshi Kogyo Kabushiki Kaisha; analysis conditions: measuring wavelength: 240.272 nm; quantification method: standard addition method (reference liquid: 100-ppm Ru-hydrochloric acid solution) after ruthenium is dissolved while being heated with concentrated hydrochloric acid to obtain a uniform solution.

Adsorption of Ruthenium to the Inorganic Adsorbent

Example 1

To a 500 mL glass conical beaker, 340 g of aqueous solution containing 680 ppm of ruthenium, 8 wt. % sodium chloride and 0.5 wt. % acetic acid, and 0.32 g of tricalcium phosphate as an inorganic adsorbent (tricalcium phosphate produced by Wako Pure Chemical Industries, Ltd; hereinafter, referred to simply as "TCP") were put, and the substances started to be stirred by a magnetic stirrer. The amount of 0.32 g of TCP was 1.4 times the amount of ruthenium by mass. Next, in order to dissolve the inorganic adsorbent, 70 wt. % sulfuric acid solution was added by use of a Komagome pipette until a pH value of 3 was obtained. The substances were stirred for 30 minutes to dissolve tricalcium phosphate. The amount of the sulfuric acid solution added was 7.5 g. Next, in order to deposit the dissolved inorganic adsorbent, 25 wt. % sodium hydroxide solution was added by use of a Komagome pipette until a pH value of 7 was obtained. Then, the substances were stirred for 30 minutes to deposit tricalcium phosphate. The amount of the sodium hydroxide solution added was 6.4 g. Then, the resultant substance was filtrated under reduced pressure by use of a Kiriyama funnel provided with a Kiriyama filter 5A. The concentration of ruthenium in the resultant filtrate was quantified by ICP emission spectrometry. The concentration was 7.9 ppm. The results are shown in Table 1.

Example 2

The same process was performed as in Example 1 except that 290 g of aqueous solution containing 690 ppm of ruthenium was used, and that 0.29 g of hydroxyapatite (apatite HAP produced by Wako Pure Chemical Industries, Ltd; monoclinic crystal; hereinafter, referred to simply as "HAP") was used as an inorganic adsorbent. The amount of 0.29 g of HAP was 1.5 times the amount of ruthenium by mass. The concentration of ruthenium in the resultant filtrate was 4.6 ppm.

Example 3

The same process was performed as in Example 1 except that 300 g of aqueous solution of the material to be adsorbed that contains 650 ppm of ruthenium was used, and that 0.29 g of hydrotalcite (hydrotalcite produced by Wako Pure Chemical Industries, Ltd; hereinafter, referred to simply as "HT") was used as an inorganic adsorbent. The amount of 0.29 g of HT was 1.4 times the amount of ruthenium by mass. The concentration of ruthenium in the resultant filtrate was 9.5 ppm.

Example 4

The same process was performed as in Example 3 except that 0.58 g of HT was used as an inorganic adsorbent. The amount of 0.58 g of HT was 2.9 times the amount of ruthenium by mass. The concentration of ruthenium in the resultant filtrate was 3.7 ppm.

Example 5

The same process was performed as in Example 3 except that 0.58 g of fluoroapatite (apatite FAP produced by Wako Pure Chemical Industries, Ltd; hexagonal crystal; hereinafter, referred to simply as "FAP") was used as an inorganic adsorbent, and that 10 wt. % sulfuric acid solution was added until a pH value of 1 was obtained. The amount of 0.58 g of FAP was 2.9 times the amount of ruthenium by mass. The concentration of ruthenium in the resultant filtrate was 7.5 ppm.

Example 6

To a 500 mL glass conical beaker, 450 g of aqueous solution containing 810 ppm of ruthenium, and 50 g of methanol, were put to prepare a methanol-containing aqueous solution. 500 g of the methanol-containing aqueous solution was put to a 1 L glass stirring tank including a stirrer and a pH meter, and started to be stirred. Next, 1.46 g of TCP was added as an inorganic adsorbent. The amount of 1.46 g of TCP was 4.0 times the amount of ruthenium by mass. Then, in order to dissolve the inorganic adsorbent, 70 wt. % sulfuric acid solution was added by use of a Komagome pipette until a pH value of 3 was obtained. The amount of the sulfuric acid solution added was 5.6 g. Then, the substances were stirred for 30 minutes to dissolve TCP. Next, in order to deposit the dissolved inorganic adsorbent, 25 wt. % sodium hydroxide solution was added by use of a Komagome pipette until a pH value of 7 was obtained. Then, the substances were stirred for 30 minutes to deposit tricalcium phosphate. The amount of the 25 wt. % sodium hydroxide solution added was 15.2 g. Then, the resultant substance was filtrated under reduced pressure by use of a Kiriyama funnel provided with a Kiriyama filter 5A. The concentration of ruthenium in the resultant 518 g of filtrate was quantified by ICP emission spectrometry. The result was 9.3 ppm.

Collection of Ruthenium from the Inorganic Adsorbent

Example 7

3.6 g of wet powder of the inorganic adsorbent obtained by filtration performed in Example 6 was put to a 1 L glass four-necked flask including a stirrer, and 150 g of pure water was put to the flask to disperse the inorganic adsorbent. Then, 70 wt. % sulfuric acid solution was added to adjust the pH value to 3. Next, 150 g of ethyl acetate was put as an extraction solvent, and 26.5 g of 12 wt. % sodium hypochlorite (12 times the amount of ruthenium by molar ratio) was added to extract ruthenium as ruthenium tetroxide into the ethyl acetate phase. At this point, the color of the ethyl acetate phase was changed to orange, which was the color of ruthenium tetroxide. Then, the extracted ruthenium tetroxide was kept still to separate 177 g of water phase in a lower layer. The concentration of ruthenium in the resultant 149 g of ethyl acetate phase was quantified by ICP emission spectrometry. The result was 2060 ppm. From this result, the collection ratio of ruthenium from the methanol-containing aqueous solution at the start to the ethyl acetate phase was 84%.

Comparative Example 1

To a 500 mL glass conical beaker, 300 g of aqueous solution containing 650 ppm of ruthenium was put, and 10 wt. % sulfuric acid solution was added by use of a Komagome pipette until a pH value of 3 was obtained. The substances were stirred for 30 minutes by a magnetic stirrer. The amount of the sulfuric acid solution added was 4.3 g. Next, 25 wt. % sodium hydroxide solution was added until a pH value of 7 was obtained. Then, the substances were stirred for 30 minutes. The amount of the sodium hydroxide solution added was 9.3 g. Then, the resultant substance was filtrated under reduced pressure by use of a Kiriyama funnel provided with a Kiriyama filter 5A. The concentration of ruthenium in the resultant filtrate was quantified by ICP emission spectrometry. The result was 110 ppm.

Comparative Example 2

To a 500 mL glass conical beaker, 300 g of aqueous solution containing 650 ppm of ruthenium was put, 0.30 g of TCP was added as an inorganic adsorbent, and the substances started to be stirred by a magnetic stirrer. The amount of 0.30 g of TCP was 1.5 times the amount of ruthenium by mass. Next, 70 wt. % sulfuric acid solution was added until a pH value of 3 was obtained. The substances were stirred for 30 minutes to dissolve TCP. The amount of the sulfuric acid solution added was 2.9 g. Then, the resultant substance was filtrated under reduced pressure by use of a Kiriyama funnel provided with a Kiriyama filter 5A. The concentration of ruthenium in the resultant filtrate was quantified by ICP emission spectrometry. The result was 93 ppm.

Comparative Example 3

To a 500 mL glass conical beaker, 300 g of aqueous solution containing 650 ppm of ruthenium was put, and 10 wt. % sulfuric acid solution was added until a pH value of 3 was obtained. The substances were stirred for 30 minutes by a magnetic stirrer. The amount of the sulfuric acid solution added was 2.6 g. Next, 25 wt. % sodium hydroxide solution was added until a pH value of 7 was obtained, and the substances were stirred for 30 minutes. The amount of the sodium hydroxide solution added was 6.6 g. Next, 0.30 g of TCP was added as an inorganic adsorbent, and the substances were stirred for 30 minutes. The amount of 0.30 g of TCP was 1.5 times the amount of ruthenium by mass. Then, the resultant substance was filtrated under reduced pressure by use of a Kiriyama funnel provided with a Kiriyama filter 5A. The concentration of ruthenium in the resultant filtrate was quantified by ICP emission spectrometry. The result was 60 ppm.

Comparative Example 4

To a 500 mL glass conical beaker, 450 g of aqueous solution containing 810 ppm of ruthenium, and 50 g of methanol, were put to prepare a methanol-containing aqueous solution. The methanol-containing aqueous solution started to be stirred by a magnetic stirrer. To 500 g of the methanol solution, 10 wt. % sulfuric acid solution was added until a pH value of 3 was obtained, and the substances were stirred for 30 minutes. The amount of the sulfuric acid solution added was 3.2 g. Next, 25 wt. % sodium hydroxide solution was added until a pH value of 7 was obtained, and the substances were stirred for 30 minutes. The amount of the sodium hydroxide solution added was 7.2 g. Then, the resultant substance was filtrated under reduced pressure by use of a Kiriyama funnel provided with a Kiriyama filter 5A. The concentration of ruthenium in the resultant filtrate was quantified by ICP emission spectrometry. The result was 120 ppm.

TABLE 1

| | Type of adsorbent | Operation of dissolving adsorbent | Addition ratio Adsorbent/Ru (times by mass) | pH when dissolved by acid | pH when deposited by alkali | Ru concentration in filtrate (ppm) |
|---|---|---|---|---|---|---|
| Example 1 | TCP | Operated | 1.4 | 3 | 7 | 7.9 |
| Example 2 | HAP | Operated | 1.5 | 3 | 7 | 4.6 |
| Example 3 | HT | Operated | 1.4 | 3 | 7 | 9.5 |
| Example 4 | HT | Operated | 2.9 | 3 | 7 | 3.7 |
| Example 5 | FAP | Operated | 2.9 | 1 | 7 | 7.5 |
| Example 6 | TCP | Operated | 4.0 | 3 | 7 | 9.3 |
| Comparative example 1 | — | — | — | 3 | 7 | 110 |
| Comparative example 2 | TCP | Operated | 1.5 | 3 | 3 (not operated) | 93 |
| Comparative example 3 | TCP | Not operated | 1.5 | 3 | 7 | 60 |
| Comparative example 4 | — | — | — | 3 | 7 | 120 |

INDUSTRIAL APPLICABILITY

According to the present invention, ruthenium or a ruthenium compound can be efficiently collected from an aqueous solution containing ruthenium or the ruthenium compound, especially an aqueous solution which contains a water-soluble salt, a lower alcohol, an organic acid or the like and cannot be easily processed by a conventional technology. Therefore, the present invention is applicable to an aqueous solution containing ruthenium or a ruthenium compound such as an aqueous solution obtained in the middle of a production process in a smelting industry or in the middle of a process for producing a chemical substance, waste water from such a production process, a material solution usable for producing a product in which ruthenium is carried, covered or plated, and the like.

The invention claimed is:

1. A method for collection of ruthenium or a ruthenium compound, comprising the steps of:
    putting an aqueous solution containing ruthenium or a ruthenium compound into contact with an inorganic adsorbent;
    dissolving the entirety or a part of the inorganic adsorbent under an acidic condition; and
    adding an alkali to deposit the dissolved inorganic adsorbent while causing the inorganic adsorbent to adsorb ruthenium or the ruthenium compound.

2. The method for collection according to claim 1, wherein the inorganic adsorbent is at least one selected from the group consisting of a calcium phosphate compound, a talcite compound, and an amorphous aluminumsilicate.

3. The method for collection according to claim 1, wherein the inorganic adsorbent is used in an amount which is, by mass, 0.1 to 100 times the amount of ruthenium or the ruthenium compound contained in the aqueous solution.

4. The method for collection according to claim 1, wherein the aqueous solution containing ruthenium or the ruthenium compound contains a water-soluble salt, a lower alcohol or an organic acid.

5. The method for collection according to claim 1, further comprising the step of performing, in advance, oxidation by an oxidizer and reduction by an alkali on the aqueous solution containing ruthenium or the ruthenium compound.

6. The method for collection according to claim 1, further comprising the step of separating and collecting the inorganic adsorbent having ruthenium or the ruthenium compound adsorbed thereto from the aqueous solution by filtration, sedimentation or centrifugation.

7. The method for collection according to claim 1, further comprising the step of putting ruthenium or the ruthenium compound adsorbed to the inorganic adsorbent into contact with an oxidizer to separate ruthenium or the ruthenium compound from the inorganic adsorbent.

8. The method for collection according to claim 7, further comprising the step of, after ruthenium or the ruthenium compound is separated from the inorganic adsorbent, putting the inorganic adsorbent into contact with an aqueous solution containing ruthenium or a ruthenium compound for reuse.

9. The method for collection according to claim 1, wherein the step of dissolving the entirety or a part of the inorganic adsorbent under an acidic condition includes the step of adding an acid such that a pH value of the aqueous solution becomes 6 or lower.

10. The method for collection according to claim 1, wherein the step of adding an alkali to deposit the dissolved inorganic adsorbent includes the step of adding the alkali such that a pH value of the aqueous solution becomes 7 or higher.

* * * * *